(12) United States Patent
Sarver

(10) Patent No.: US 10,925,259 B2
(45) Date of Patent: Feb. 23, 2021

(54) CLIMBING APPARATUS FOR PET TRAINING AND FITNESS

(71) Applicant: Eco Sports Group, Inc., Indianapolis, IN (US)

(72) Inventor: John T. Sarver, Indianapolis, IN (US)

(73) Assignee: Eco Sports Group, Inc., Indianapolis, IN (US)

( * ) Notice: Subject to any disclaimer, the term of this patent is extended or adjusted under 35 U.S.C. 154(b) by 0 days.

(21) Appl. No.: 16/669,048

(22) Filed: Oct. 30, 2019

(65) Prior Publication Data

US 2020/0060234 A1 Feb. 27, 2020

Related U.S. Application Data

(63) Continuation of application No. 15/586,044, filed on May 3, 2017, now Pat. No. 10,492,471, which is a continuation of application No. 15/524,170, filed as application No. PCT/US2016/037105 on Jun. 11, 2016, now Pat. No. 10,485,221.

(60) Provisional application No. 62/174,830, filed on Jun. 12, 2015, provisional application No. 62/218,025, filed on Sep. 14, 2015.

(51) Int. Cl.
*A01K 15/02* (2006.01)
*A63K 3/04* (2006.01)

(52) U.S. Cl.
CPC .............. *A01K 15/027* (2013.01); *A63K 3/04* (2013.01); *A63K 3/046* (2013.01)

(58) Field of Classification Search
CPC ........ A01K 15/027; A01K 15/02; E06C 1/39; E06C 1/393; E06C 7/16; E04G 1/30; E04G 2001/305; E04G 1/15; E04G 1/28; E01D 15/24; A63G 21/00
See application file for complete search history.

(56) References Cited

U.S. PATENT DOCUMENTS

| 1,593,945 A * | 7/1926 | Macklem ................. E06C 7/16 |
| | | 182/119 |
| 2,620,185 A | 12/1952 | Harding |
| 3,372,772 A * | 3/1968 | Singer ..................... E06C 7/006 |
| | | 182/230 |

(Continued)

OTHER PUBLICATIONS

Dog on it Parks, A-Frame: A Dog Agililty Classic, http://www.dog-on-it-parks.com/blog/frame-dog-agility-classic/ (last visited Mar. 28, 2017). (U.S. Appl. No. 15/586,044).

(Continued)

*Primary Examiner* — Kristen C Hayes
(74) *Attorney, Agent, or Firm* — Thomas|Horstemeyer, LLP

(57) ABSTRACT

Disclosed are various embodiments for a climbing apparatus for pet training and exercise. The climbing apparatus for exercising or training pets may include, for example, a first ramp directly coupled to a second ramp at a coupling point located at a peak of a hill, the first ramp and the second ramp having an angle of incline that is substantially similar, thereby forming a substantially symmetrical and triangular structure. The first ramp and the second ramp can include supports projecting from a surface of the first ramp and the second ramp to facilitate navigation of a path that comprises an incline of the first ramp and a decline of the second ramp. In addition, the supports can render the apparatus freestanding and portable.

20 Claims, 9 Drawing Sheets

(56) References Cited

U.S. PATENT DOCUMENTS

| | | | |
|---|---|---|---|
| 3,572,698 | A | 3/1971 | Greenly |
| 4,004,652 | A * | 1/1977 | Laboy-Alvarado .......................... E01D 15/124 182/118 |
| 4,023,647 | A * | 5/1977 | Confer .................... E04H 4/144 182/108 |
| 4,369,965 | A | 1/1983 | Ahrens |
| D340,101 | S | 10/1993 | Ingold et al. |
| 5,279,387 | A * | 1/1994 | Swiderski ................. E06C 1/32 182/108 |
| 5,358,069 | A | 10/1994 | Krause |
| 5,372,550 | A | 12/1994 | Gleeson et al. |
| 5,454,446 | A * | 10/1995 | Zelikovitz ................. E06C 1/22 182/107 |
| D388,520 | S * | 12/1997 | Hoffman ......................... D25/64 |
| 6,053,824 | A | 4/2000 | Boudreaux |
| 6,209,683 | B1 * | 4/2001 | Holtz ...................... B25H 1/06 182/153 |
| 6,892,860 | B2 * | 5/2005 | Gibson ..................... E04G 1/28 108/119 |
| 7,424,933 | B2 * | 9/2008 | Weiss ........................ E06C 1/32 16/328 |
| 8,186,480 | B1 * | 5/2012 | Yoakum, Jr. .............. E06C 1/39 182/118 |
| 8,191,681 | B2 * | 6/2012 | Lipniarski ................ E06C 7/006 182/106 |
| 8,997,930 | B2 * | 4/2015 | Moss ....................... B25H 1/06 182/129 |
| D804,740 | S * | 12/2017 | Sarver .......................... D30/160 |
| 2004/0229732 | A1 | 11/2004 | Wang et al. |
| 2007/0240938 | A1* | 10/2007 | Butera ...................... E06C 1/39 182/165 |
| 2007/0256893 | A1 | 11/2007 | Horn et al. |
| 2010/0044154 | A1 | 2/2010 | Lipniarski |
| 2014/0150188 | A1 | 6/2014 | Allen |

OTHER PUBLICATIONS

Dog on it Parks, Dog Walk Ramp, http://www.dog-on-it-parks.com/dog-walk-ramp.html (last visited Mar. 28, 2017). (U.S. Appl. No. 15/586,044).

Dog on it Parks, Wait Table, http://www.dog-on-it-parks.com/wait-table-8-16-high.html (last visited Mar. 28, 2017). (U.S. Appl. No. 15/586,044).

Dog on it Parks, Whippet Walk, http://www.dog-on-it-parks.com/whippet-walk.html (last visited Mar. 28, 2017). (U.S. Appl. No. 15/586,044).

Dog on it Parks, Dachshund Double Ramp, http://www.dog-on-it-parks.com/dachshund-double-ramp.html (last visited Mar. 28, 2017). (U.S. Appl. No. 15/586,044).

Dog on it Parks, Collie Crawl, http://www.dog-on-it-parks.com/collie-crawl.html (last visited Mar. 28, 2017). (U.S. Appl. No. 15/586,044).

Barkpark, Dog Walk, http://www.dogparkproduct.com/activities/dog_walk.html (last visited Mar. 28, 2017). (U.S. Appl. No. 15/586,044).

Barkpark, King of the Hill, http://www.dogparkproduct.com/activities/king_of_the_hill.html (last visited Mar. 28, 2017). (U.S. Appl. No. 15/586,044).

Agility Bits. Garden Dog Walk. Manual [online]. 2012 [retrieved on Nov. 28, 2012]. Retrieved from the internet <URL: https://web.archive.org/web/20 121128035633/http:/lwww .agilitybits.co.uk/Equipment/dogwalk2/dogwalk2. htm> (U.S. Appl. No. 15/586,044).

International Search Report for PCT/US2016/037105 dated Oct. 14, 2016. (U.S. Appl. No. 15/586,044).

* cited by examiner

CLIMBING APPARATUS FOR PET TRAINING AND FITNESS

CROSS-REFERENCE TO RELATED APPLICATIONS

This application is a continuation of, and claims priority to, U.S. patent application Ser. No. 15/586,044 filed May 3, 2017, entitled "HILL CLIMBING APPARATUS FOR PET TRAINING AND FITNESS," which is a continuation of U.S. patent application Ser. No. 15/524,170 filed on May 3, 2017, entitled "BRIDGE CLIMBING APPARATUS FOR PET TRAINING AND FITNESS," which is a 35 U.S.C. § 371 national stage application of PCT Application No. PCT/US2016/037105 filed Jun. 11, 2016, entitled "FREE-STANDING PORTABLE PET TRAINING AND EXERCISE EQUIPMENT," where the PCT claims the benefit of and priority to U.S. Provisional Patent Application No. 62/174,830, filed Jun. 12, 2015, entitled "FREESTANDING PORTABLE DOG TRAINING EQUIPMENT," and U.S. Provisional Patent Application No. 62/218,025, filed Sep. 14, 2015, entitled "FREESTANDING PORTABLE DOG TRAINING EQUIPMENT," the contents of each of which are incorporated by reference herein in their entirety.

This application relates to U.S. patent application Ser. No. 29/557,651, filed Mar. 10, 2016, entitled "PET CLIMBING PLATFORM," now issued as U.S. Pat. No. D804,740, U.S. patent application No. 29/557,656, filed Mar. 11, 2016, entitled "PET CLIMBING APPARATUS," now issued as U.S. Pat. No. D805,263, and U.S. patent application Ser. No. 29/557,659, filed Mar. 10, 2016, entitled "PET HURDLES," the contents of each of which are incorporated by reference herein in their entirety.

BACKGROUND

Pets, such as dogs, cats, and other animals, require outdoor play, exercise, physical stimulation, and mental stimulation to be healthy. Animal parks and play areas contribute to the health and well-being of a pet by facilitating an environment where pets can play, exercise, learn, and train off their leash. However, animal parks and play areas tend to lack the equipment necessary to enable improvement to a pet's agility, balance, conditioning, and strength in its hindquarters, which is important for many pets, such as dogs, especially as they age, becoming susceptible to arthritis and hip dysplasia. Moreover, maintaining strong muscles in a pet's legs and hips helps maintain and even improve the pet's mobility. Most animal park and play area agility equipment offered today are agility products that are not "intuitive" for a pet, meaning a pet has to be coached or trained to utilize the products.

An additional problem with animal park and play area equipment is that it may require holes to be dug or concrete to be poured into the ground in order to be installed, thereby destroying grass or other terrain and requiring specialized skills and equipment for installation. Thus, there is a need for animal park and play area equipment that facilitates the development of agility, balance, conditioning, and hindquarter strength in pets, while also being used in a way that does not destroy the terrain. These features also allow the equipment to be portable in nature, allowing a park department or other user to store the equipment during the winter or re-locate the equipment to a different area to give the grass a break from all the animal park and play area traffic.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of freestanding portable pet equipment for training and exercising animals and its components is provided, followed by a discussion of various embodiments of the same. While various embodiments described herein refer to apparatuses used in the training or exercising of dogs, the freestanding portable pet equipment is not so limited and can be used in training or exercising other animals, such as cats, horses, and other pets.

Embodiments of the disclosure include various apparatuses, methods, and mechanisms directed to freestanding portable pet training and exercising equipment that can be used to create an environment where dogs and other pets can improve and develop agility, balance, and body strength. Such apparatuses, methods, and mechanisms can be employed in various ways to allow pets to play and train without the apparatuses destroying or puncturing the terrain. Such apparatuses, methods, and mechanisms can also be employed in various ways to allow for an easy assembly by an end user and also makes the product portable if, for example, a user decides to move equipment to differing locations for shade variance, turf management, seasonal weather, or other reason. In addition, the disclosed equipment is more intuitive for pets and designed to be more playful or play-related while offering improvements to balance, stability, strength, and agility conditioning. The features of the disclosed products have been designed to be easy for a pet, such as a dog, to use and also more inviting by having low profiles and less step angles and using materials that have more natural aesthetics.

Figure 1:
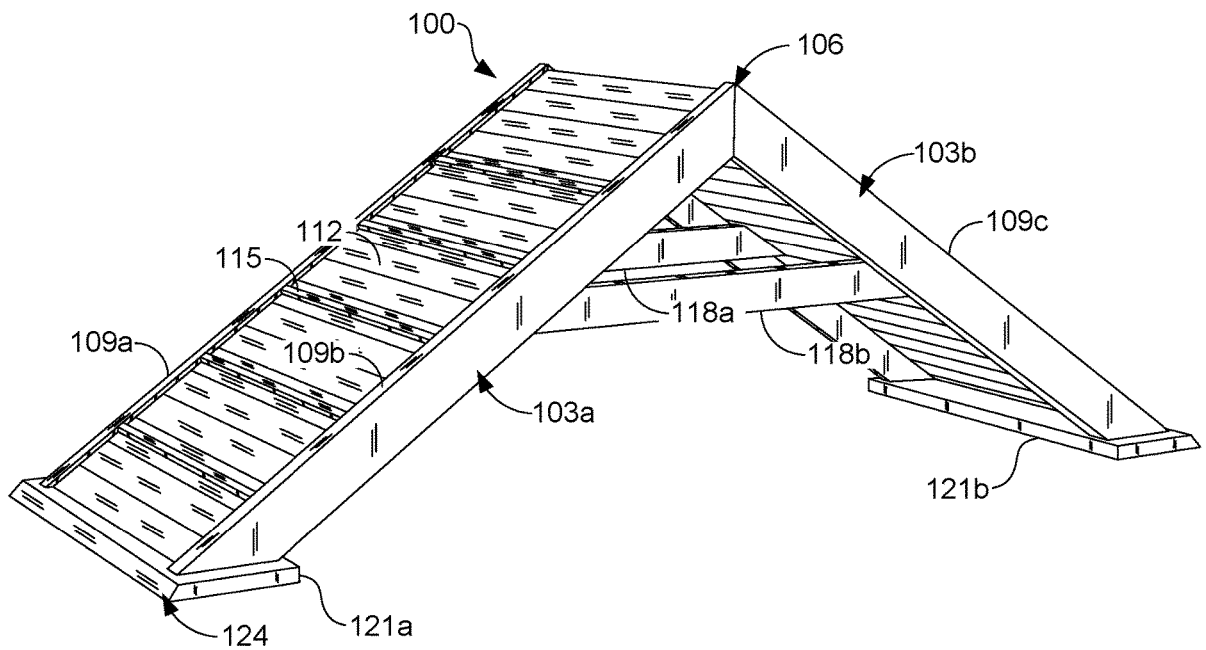
FIG. 1 shows a first embodiment of a freestanding portable pet apparatus according to various embodiments of the present disclosure.

With reference to FIG. 1, shown is a first embodiment of a freestanding portable pet apparatus 100 according to various embodiments of the present disclosure. To provide exercise to a pet, such as a dog, the freestanding portable pet apparatus 100 assumes the shape of a hill, thereby exercising muscles of a pet required to traverse an incline and navigate a decline. In some embodiments, the freestanding portable pet apparatus 100 can be symmetrical in shape.

In the example of FIG. 1, the freestanding portable pet apparatus 100 includes a first ramp 103*a* and a second ramp 103*b* (collectively "ramps 103") directly coupled at a coupling point 106, which can be located at a peak of the freestanding portable pet apparatus 100. In some embodiments, the first ramp 103*a* and the second ramp 103*b* assume an approximate incline and decline of or between 20° to 35°, respectively; however, in alternative embodiments, each ramp 103 can assume a lower or higher degree of incline as suited. The first ramp 103*a* and the second ramp 103*b* can include ramp sides 109*a* . . . 109*c* (collectively "ramp sides 109") which protrude from a surface 112 of a respective one of the ramps 103 to provide a safety rail. In some embodiments, the ramp sides 109 can be trapezoidal-shaped, whereby the ends are cut or otherwise shaped at 90° angles to allow an end of the ramp side 109*a* to mount flush with an opposing end of the ramp side 109*c* at the coupling point 106.

Further, the first ramp 103*a* and the second ramp 103*b* can include supports 115 that protrude from the surface 112 of a respective one of the ramps 103, thereby providing paw or hoof support for a pet as it navigates the ramps 103. For example, the supports 115 may protrude an inch (or other suitable dimension) from the surface 112 of a respective one of the ramps 103. In some embodiments, the supports 115 span a width of the surface 112 of a respective ones of the ramps 103 such that they are coupled to the ramp sides 109.

Beyond coupling at the coupling point 106, the first ramp 103*a* and the second ramp 103*b* can be further coupled via coupling members 118*a* and 118*b* (collectively "coupling members 118") extending horizontally between the ramps 103. Like the ramp sides 109, the coupling members 118 can assume a trapezoidal shape, having ends cut or otherwise shaped at a suitable angle to mount flush with a bottom of the first ramp 103*a* and the second ramp 103 while being parallel to the ground, as illustrated in FIG. 1. As can be appreciated, the coupling members 118 provide further support as weight is applied to one of the ramp sides 109 or when the freestanding portable pet apparatus 100 is moved and relocated.

Figure 11:
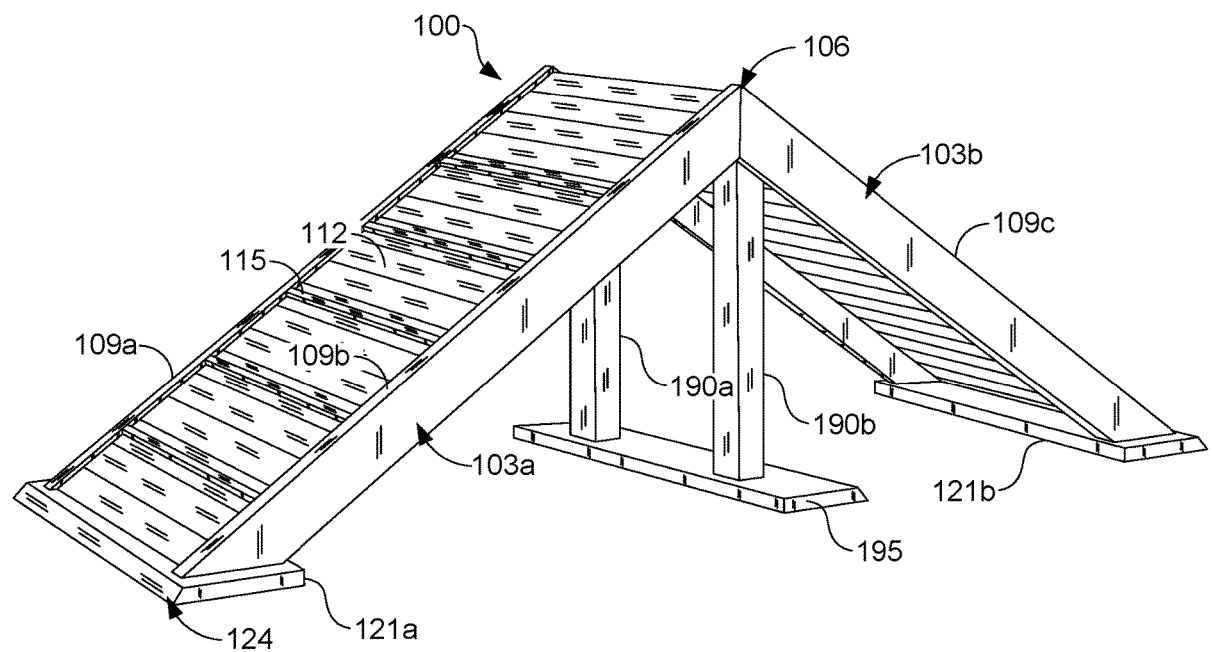
FIG. 11 shows another of a freestanding portable pet apparatus according to various embodiments of the present disclosure.

Bottom ends of the ramp sides 109 (opposite to that of the coupling point 106) can be coupled to ramp feet 121*a* and 121*b* (collectively "ramp feet 121"). As some embodiments described herein include the ramp sides 109 assuming a trapezoidal shape, a top surface of the ramp feet 121 can assume a same or similar angle as a bottom end of the ramp sides 109 such that the bottom end of the ramp sides 109 mates flush with the top surface of the ramp feet 121. The ramp feet 121 can include a width wider to that of the ramp sides 109 to provide additional support and balance to the freestanding portable pet apparatus 100. Additionally, a front 124 of the ramp feet 121 can assume an angle the same as or similar to that of the ramp sides 109, for example, to prevent a pet from stumbling on the ramp feet 121. [0021a] In the example of FIG. 11, the freestanding portable pet apparatus 100 includes a first post 190*a* for supporting the freestanding portable pet apparatus 100 at a first side and a second post 190*b* for supporting the freestanding portable pet apparatus 100 at a second side. The freestanding portable pet apparatus 100 further includes a platform foot 195, wherein the first post 190*a* and the second post 190*b* are coupled to the platform foot 190.

Figure 2:
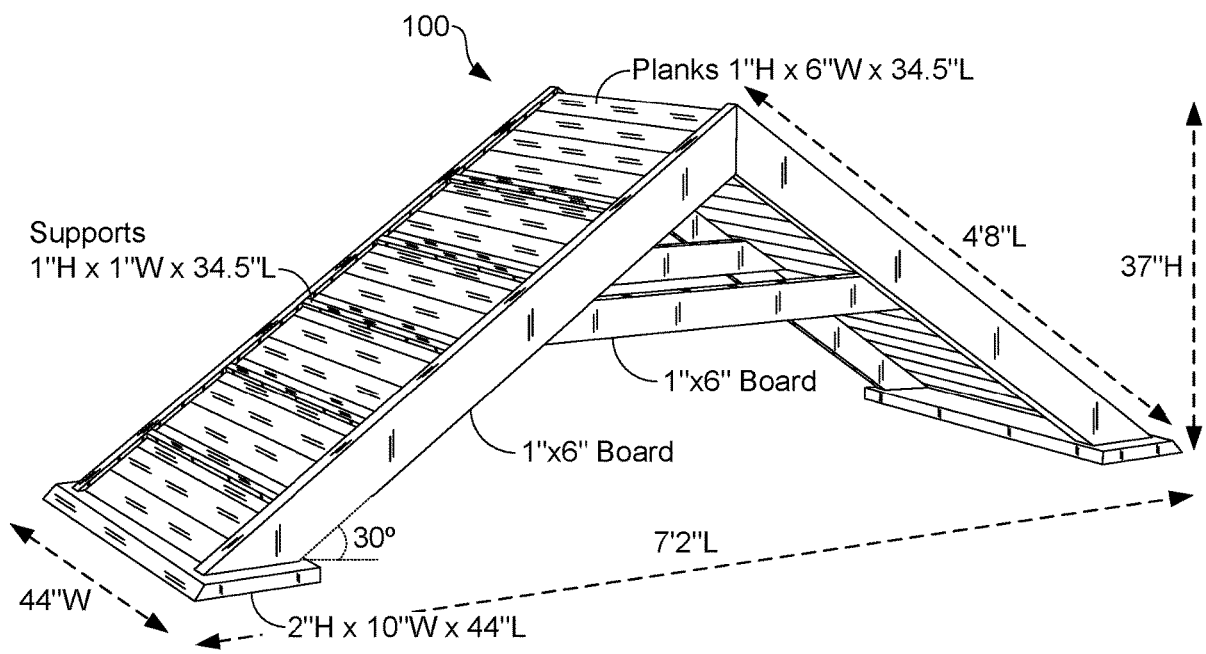
FIG. 2 shows example dimensions of the first embodiment of the freestanding portable pet apparatus of FIG. 1 according to various embodiments of the present disclosure.

Moving on to FIG. 2, example dimensions of the embodiment of the freestanding portable pet apparatus 100 of FIG. 1 are shown according to various embodiments of the present disclosure. In some embodiments, individual ones of the supports 115 can include a block with dimensions of approximately a height of one inch, a width of one inch, and a length of 34.5 inches. As can be appreciated, the supports 115 can assist pets, such as dogs, when ascending and descending on the ramps without sliding. In some embodiments, the surface 112 of the ramps 103 include wooden or plastic boards. To this end, in some embodiments, the boards can include dimensions of approximately a height of one inch, a width of 6 inches, and a length of 34.5 inches. In other embodiments, the boards can have a width of approximately 4 inches, 5.5 inches, or other suitable width.

The freestanding portable pet apparatus 100 can assume a height to width ratio that provides suitable stability without requiring affixation to the terrain using any concrete footers or other affixing mechanism. In one example, a height of the freestanding portable pet apparatus 100 is 37 inches and a length of the freestanding portable pet apparatus 100 is 7 feet and 2 inches (an approximate height to length ratio of 0.43), while the first ramp 103*a* and the second ramp 103*b* have a length of approximately 4 feet and 8 inches. The dimensions of the ramp feet 121 can include a height of 2 inches, a width of 10 inches, and a length of 44 inches. The coupling members 118 and the ramp sides 109 can be constructed from one inch by 6 inch boards or other material. In some embodiments, length of the ramps 103 can be 4 feet and 8 inches. The surface 112 of the ramps 103 can include multiple boards coupled together where each board has a height of one inch, a width of 6 inches, and a length of 34.5 inches. It should be noted that the dimensions described in FIG. 2 are merely for example purposes, and that the freestanding portable pet apparatus 100 can assume other dimensions, as suited.

Figure 3:
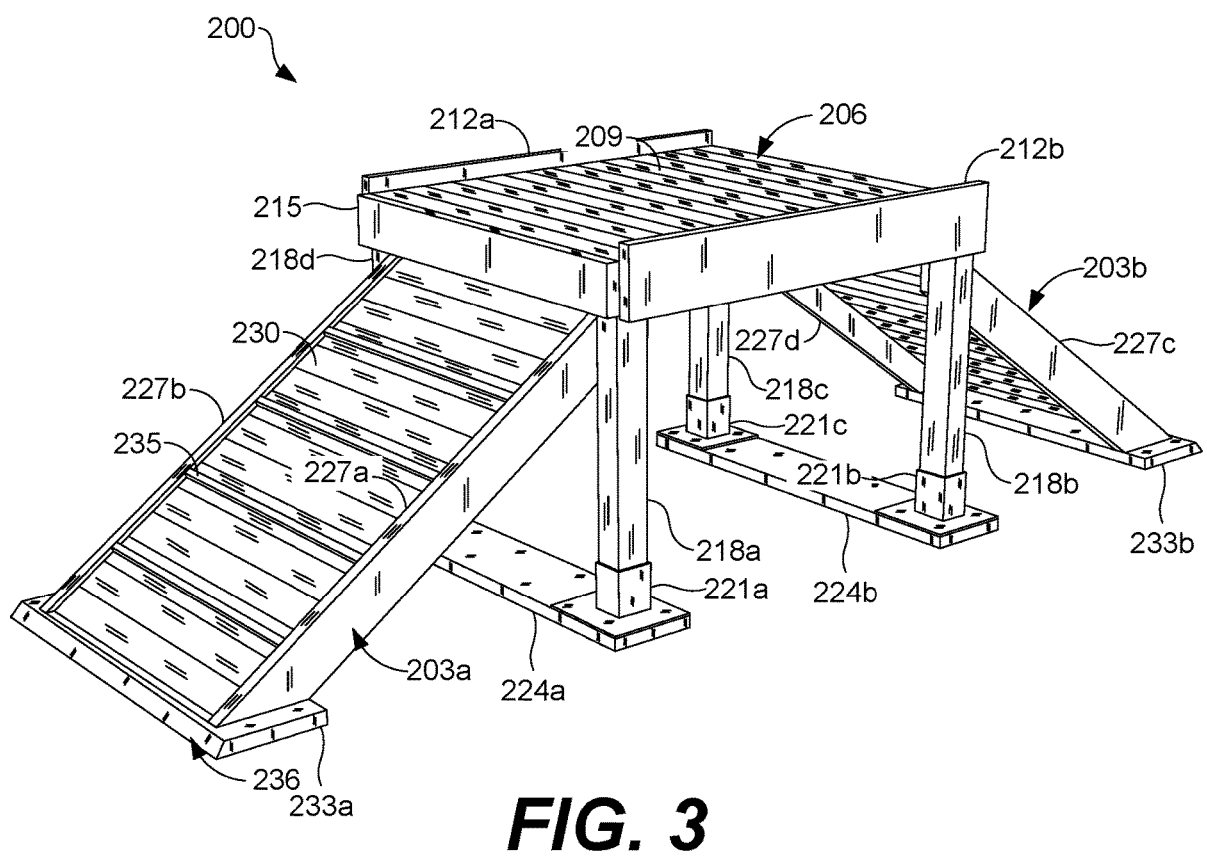
FIG. 3 shows a second embodiment of a freestanding portable pet apparatus according to various embodiments of the present disclosure.

Moving on to FIG. 3, shown is a second embodiment of a freestanding portable pet apparatus 200. In FIG. 3, the freestanding portable pet apparatus 100 is shown as having a first ramp 203*a* and a second ramp 203*b* (collectively "ramps 203"), with a platform 206 positioned between the first ramp 203*a* and the second ramp 203*b*, thereby forming a bridge or similar structure. In some embodiments, the freestanding portable pet apparatus 200 can be symmetrical in shape.

The platform 206 can include a platform surface 209, platform sides 212*a* and 212*b* (collectively "platform sides 212"), a platform front 215, and a platform back (not shown) at an opposite side of the platform 206 from the platform front 215. The platform 206 can be supported by a plurality of posts 218*a* . . . 218*d* (collectively "posts 218"). In some embodiments, the platform 206 is supported by four posts 218, although other suitable amount of posts 218 can be employed to provide load bearing stability.

The posts 218 can be positioned in post anchors 221*a* . . . 221*c* (collectively "post anchors 221") affixed to platform feet 224*a* and 224*b* (collectively "platform feet 224"). In some embodiments, the freestanding portable pet apparatus 200 can include two platform feet 224 where two posts 218 are positioned in each of the platform feet 224. The platform feet 224 can include a width that provides additional support and stability, as can be appreciated. In some embodiments, the posts 218 can be coupled directly to the platform feet 224 without using the post anchors 221.

The platform sides 212 can be configured to protrude beyond the platform surface 209 to act as a safety rail, thereby deterring a pet traversing the platform 206 from attempting to leave the platform surface 209 from one of the platform sides 212. The top of the platform front 215 and the platform back (not shown) can be flush with the platform surface 209.

The first ramp 203a and the second ramp 203b can assume an incline in the range of 20° to 35°, respectively; however, in alternative embodiments, each ramp 203 can assume a lower or higher degree of incline or decline as suited. The first ramp 203a and the second ramp 203b can include ramp sides 227a . . . 227d (collectively "ramp sides 227") which protrude from a ramp surface 230 of a respective one of the ramps 203. In some embodiments, the ramp sides 227 can assume a trapezoidal shape where the ends are cut or otherwise shaped at 90° angles.

Bottom ends of the ramp sides 227 (opposite to that of the platform 206) can be coupled to ramp feet 233a and 233b (collectively "ramp feet 233"). As some embodiments described herein include the ramp sides 227 assuming a trapezoidal shape, a top surface of the ramp feet 233 can assume a same or similar angle as a bottom end of the ramp sides 227 such that the bottom end of the ramp sides 227 mates flush with the top surface of the ramp feet 233. The ramp feet 233 can include a width wider to that of the ramp sides 227 to provide additional support and balance to the freestanding portable pet apparatus 200. Additionally, a front 236 of the ramp feet 233 can assume an angle the same as or similar to that of the ramp sides 227, for example, to prevent a pet from stumbling on the ramp feet 233. In some embodiments, a beam or other load bearing device (not shown), such as a 2×4, can be positioned on a bottom side of the ramp 203 parallel to and centered between the ramp sides 227, while spanning a length of the ramp 203. This load bearing device can provide additional support and stability for the ramps 203, as can be appreciated.

Further, the first ramp 203a and the second ramp 203b can include supports 235 that protrude from the ramp surface 230 of a respective one of the ramps 203, thereby providing paw or hoof support for a pet as it navigates the ramps 203. In some embodiments, the supports 235 assume a width of the surface 112 of a respective ones of the ramps 203 such that they can be coupled to the ramp sides 227.

In various embodiments, some or all of the components of the freestanding portable pet apparatus 200 described above can be constructed of recycled plastic, such as high-density polyethylene. In other embodiments, the components can be constructed of natural weather-resistant cedar or pressure-treated lumber. To this end, in various embodiments, the freestanding portable pet apparatus 200 can be positioned on a terrain without the use of concrete footers or any other permanent affixing mechanism, while remaining stable enough to withstand a load and movement of a pet without the apparatus moving or toppling over.

Figure 4:
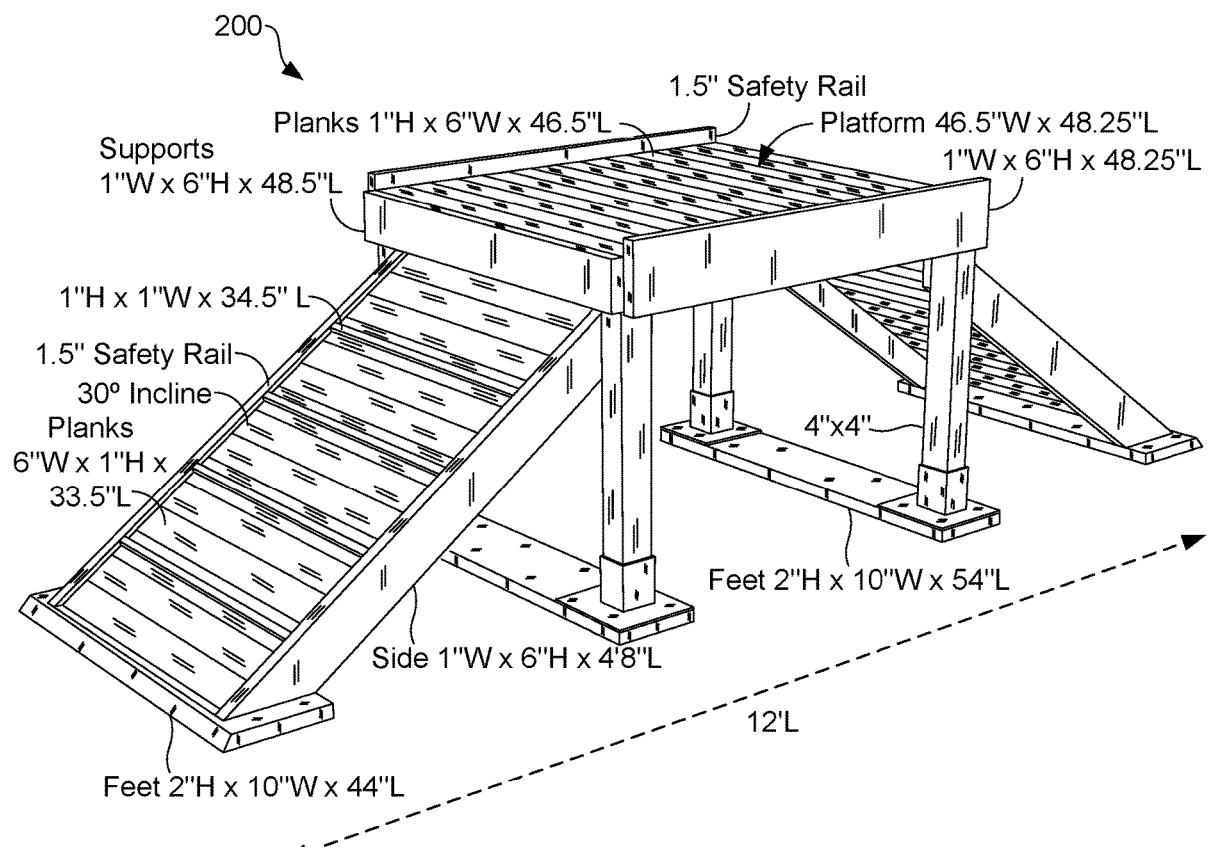
FIG. 4 shows example dimensions of the second embodiment of the freestanding portable pet apparatus of FIG. 3 according to various embodiments of the present disclosure.

Moving on to FIG. 4, example dimensions of the embodiment of the freestanding portable pet apparatus 200 of FIG. 3 are shown according to various embodiments of the present disclosure. In some embodiments, individual ones of the posts 218 can be 4 inches×4 inches. The platform sides 212 can have a width of approximately one inch, a height of approximately six inches, and a length of approximately 48.24 inches. The platform sides 212 can be situated in association with the platform surface 209 to create a safety rail of approximately 1.5 inches. The platform surface 209 can have a width of 46.5 inches and a length of 48.25 inches. The platform surface 209 can be made of a plurality of planks having a height of one inch, a width of 6 inches, and a length of 46.5 inches. The platform front 215 and the platform back (not shown) can have a width of one inch, a height of 6 inches, and a length of 48.5 inches.

The supports 235 can have a height of one inch, a width of one inch, and a length of 34.5 inches. The ramp sides 227 can have a width of one inch, a height of 6 inches, and a length of 4 feet and 8 inches. The ramp sides 227 can be positioned in association with the ramp surface 230 such that a 1.5 inch safety rail is formed on the ramp 203. The ramp feet 233 can have a height of 2 inches, a width of 10 inches, and a length of 44 inches. In addition, the front 236 of the ramp feet 233 can have a slope or incline substantially similar to a corresponding one of the ramps 203. In some embodiments, the ramps 203 can have a 30° incline. The ramp surface 230 can be made up of a plurality of planks having a width of 6 inches, a height of one inch, and a length of 33.5 inches. An overall length of the freestanding portable pet apparatus 200 can be 12 feet. It should be noted that the dimensions described in FIG. 4 are merely for example purposes, and that the freestanding portable pet apparatus 200 can assume other dimensions, as suited.

Figure 5:
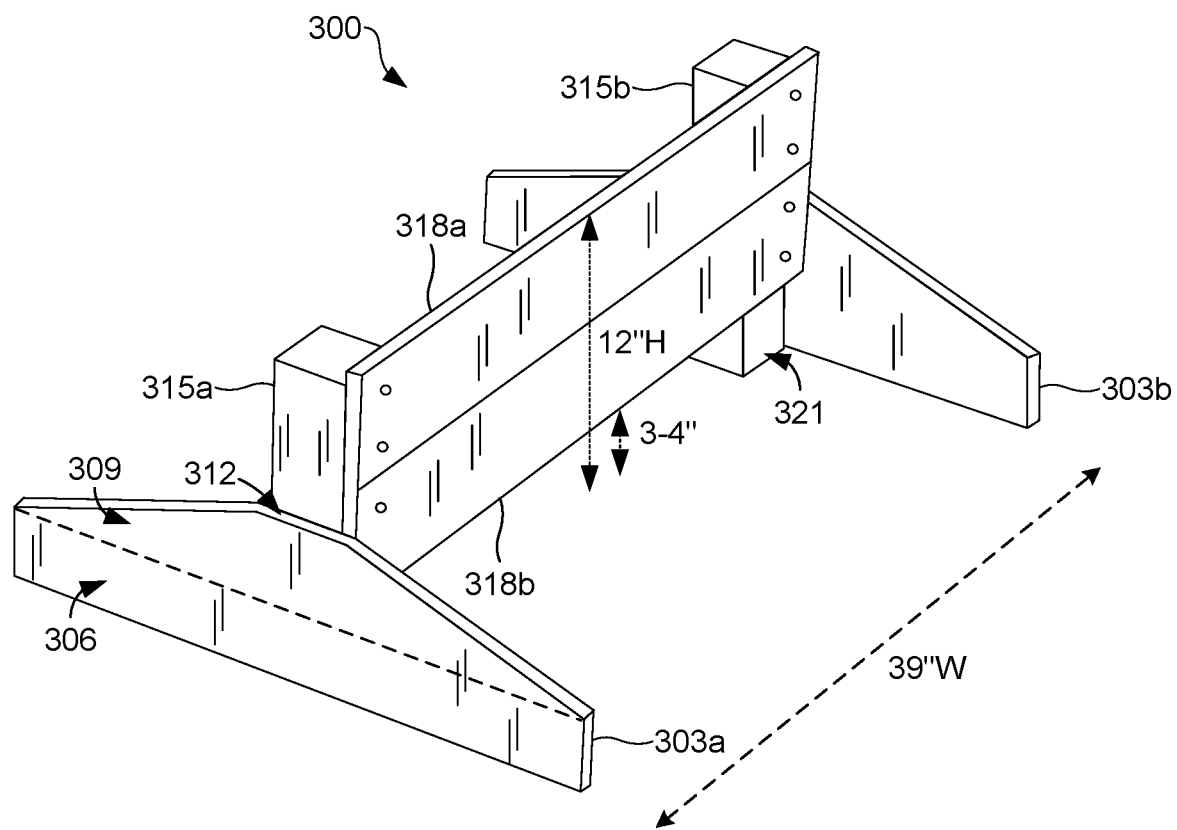
FIGS. 5-7 show examples of a third embodiment of a freestanding portable pet apparatus according to various embodiments of the present disclosure.

Moving on to FIG. 5, a third embodiment of a freestanding portable pet apparatus 300 is shown. In FIG. 5, the freestanding portable pet apparatus 300 forms a hurdle, allowing a pet, such as a dog, to obtain physical activity by jumping over the hurdle. To this end, the freestanding portable pet apparatus 300 can include a first hurdle base 303a and a second hurdle base 303b (collectively "hurdle bases 303"). In some embodiments, a lower portion 306 of the hurdle bases 303 are rectangular in shape whereas an upper portion 309 of the hurdle bases 303 are triangular, trapezoidal, or rhombular (resembling a rhombus) in shape. In embodiments where the upper portion 309 of the hurdle bases 303 are rhombular, the top of the rhombular shape in the upper portion 309 can include a flat portion 312 located a top of the hurdle bases 303, as shown in FIG. 5.

A first hurdle post 315a can be coupled to directly an interior of the first hurdle base 303a while a second hurdle post 315b can be coupled directly to an interior of the second hurdle base 303b. In some embodiments, a width of the hurdle posts 315 can be substantially similar to a width to the flat portion 312 of the hurdle base 303. One or more boards 318a and 318b (collectively boards 318) can be coupled to the hurdle posts 315 while retaining an exposed lower portion 321 of the hurdle posts 315. In some embodiments, the boards 318 can be positioned to protrude above a top of the hurdle posts 315, while, in other embodiments, the boards 318 can be positioned to be flush with a top of the hurdle posts 315.

Further, the hurdle posts 315 can be positioned at a distal end of the boards 318 such that a side of the hurdle posts 315 and the boards 318 are flush with an interior side of the hurdle base 303. In some embodiments, a height of the freestanding portable pet apparatus 300 having two boards 318 can include approximately 12 inches, or other suitable height, while a width of the freestanding portable pet apparatus 300 is approximately 39 inches (e.g., height to width ratio of approximately 0.31).

Figure 6:
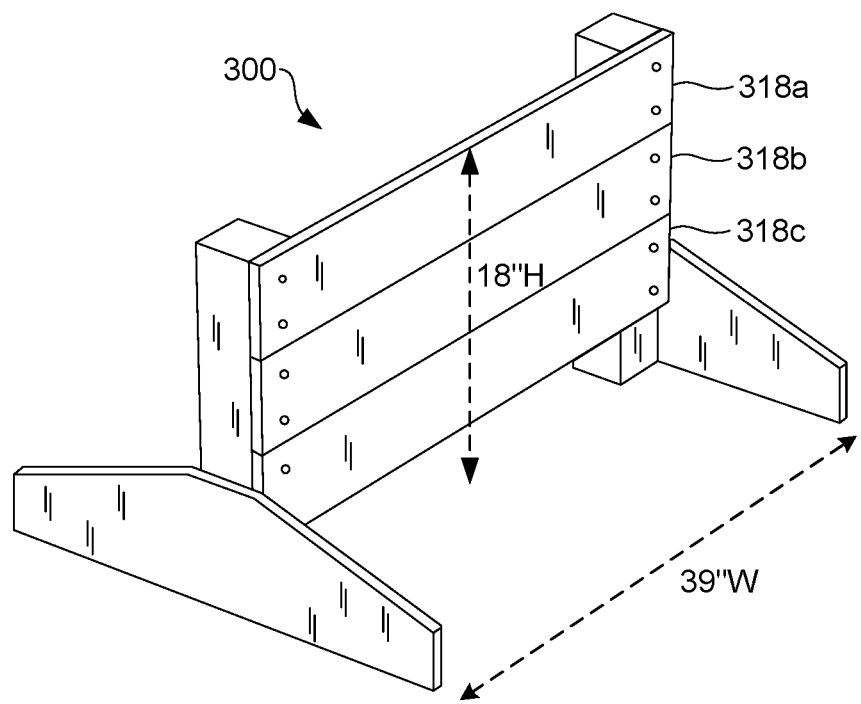
Figure 7:
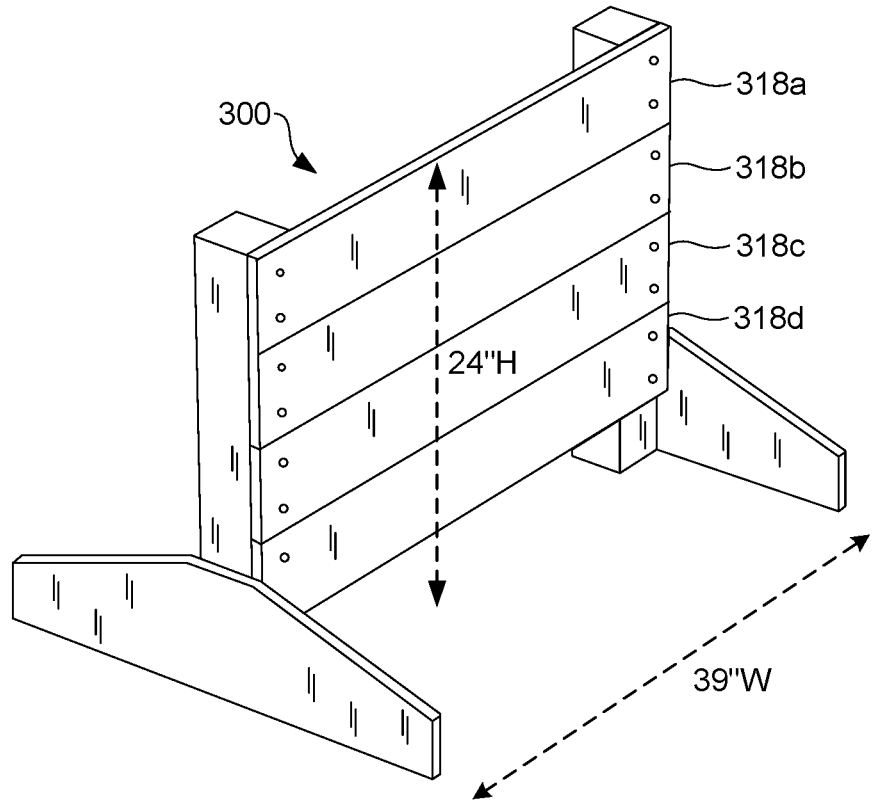

Another embodiment of the freestanding portable pet apparatus 300 having three boards 318a . . . 318c is shown in FIG. 6. In this example, a height of the freestanding portable pet apparatus 300 having three boards 318 can include approximately 18 inches, or other suitable height, while a width of the freestanding portable pet apparatus 300 is approximately 39 inches (e.g., height to width ratio of approximately 0.46). In FIG. 7, another embodiment of the freestanding portable pet apparatus 300 having four boards 318*a* . . . 318*d* is shown. In this example, a height of the freestanding portable pet apparatus 300 having four boards 318 can include approximately 24 inches, or other suitable height, while a width of the freestanding portable pet apparatus 300 is approximately 39 inches (e.g., height to width ratio of approximately 0.62). In some embodiments, a gap of approximately three to four inches, or other suitable dimension, is provided between a bottom of the boards 318 and the ground. In various embodiments, the freestanding portable pet apparatuses 300 of FIGS. 5-7 can be aligned in an order of increasing height or decreasing height, although other arrangements can be employed.

Figure 8:
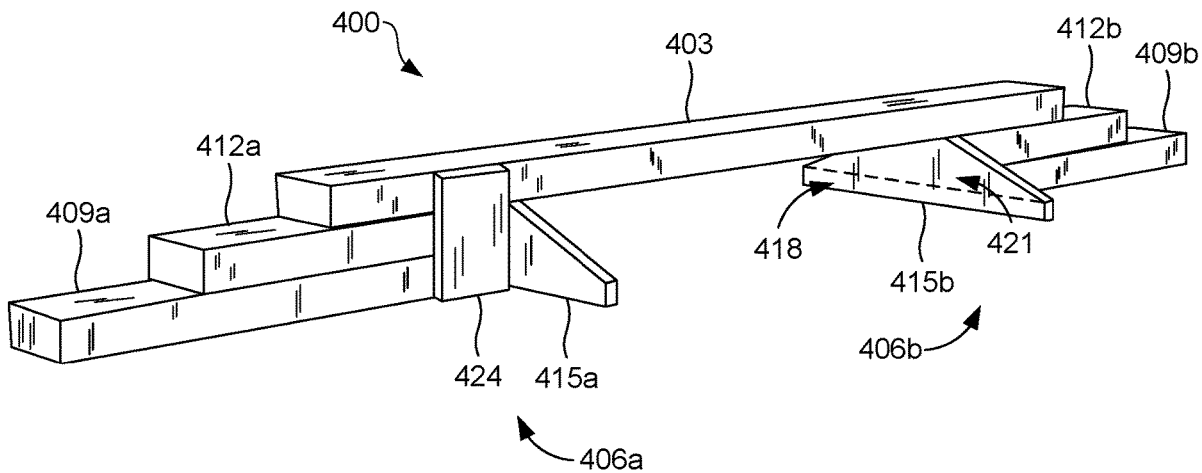
FIG. 8 shows a fourth embodiment of a freestanding portable pet apparatus according to various embodiments of the present disclosure.

Moving on to FIG. 8, shown is a fourth embodiment of a freestanding portable pet apparatus 400. In FIG. 8, the freestanding portable pet apparatus 400 can include a balance beam 403 for pets to navigate for training, exercise, or other physical activity. The balance beam 403 can be supported by a first beam base 406*a* and a second beam base 406*b* (collectively "beam bases 406"). The freestanding portable pet apparatus 400 can be symmetrical in some embodiments. The beam bases 406 can include, for example, a first step 409*a* and 409*b*, a second step 412*a* and 412*b*, and a horizontal support 415*a* and 415*b* perpendicular to a position of the balance beam 403. The first steps 409 can include an elongated structure disposed below the second steps 412, while the second steps 412 are disposed below the balance beam 403.

Similar to the hurdle base 303 described above with respect to FIG. 5, the horizontal supports 415 can be described as having a lower region 418 and an upper region 421. The lower region 418 can be substantially rectangular in shape while the upper region can be trapezoidal or rhombular in shape. As shown in FIG. 8, a top flat portion of the upper regions 421 of the horizontal supports 415 can assume a width substantially similar to that of the balance beam 403, while the upper region 421 and the lower region 418 extend outwards from the top flat portion, creating additional support and stability for the balance beam 403.

In some embodiments, the freestanding portable pet apparatus 400 can include a tie post 424 which couples the first step 409, the second step 412, the balance beam 403, and the horizontal support 415. In some embodiments, the tie post 424 is a height substantially similar to that of a top of the balance beam 403 such that the tie post 424 is flush with a top of the balance beam 403. Additionally, the tie post 424 can be positioned at an interior distal end of the beam base 406 to mount flush with a corner generated by the horizontal support 415.

Figure 9:
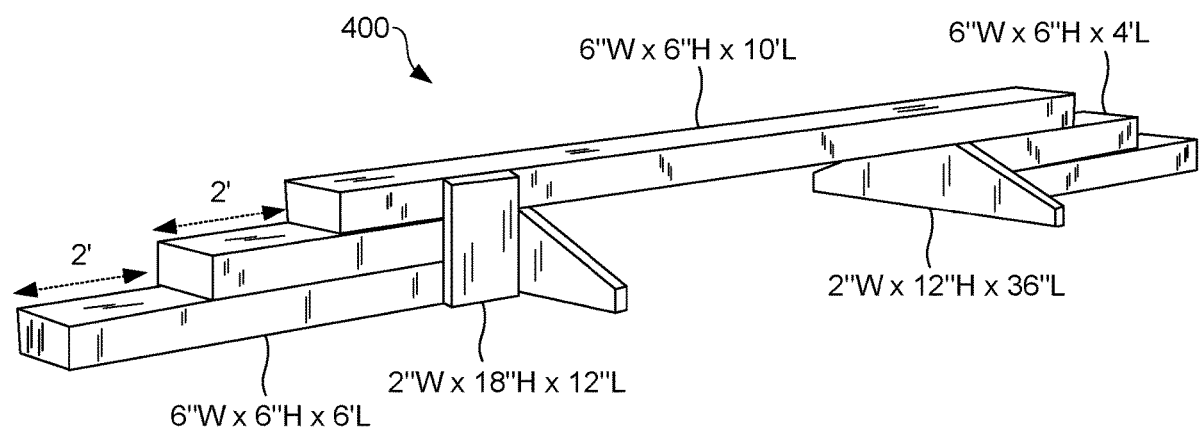
FIG. 9 shows example dimensions of the first embodiment of the freestanding portable pet apparatus of FIG. 8 according to various embodiments of the present disclosure.

Moving on to FIG. 9, example dimensions of the embodiment of the freestanding portable pet apparatus 400 of FIG. 8 are shown according to various embodiments of the present disclosure. In some embodiments, the balance beam 403 can have a width of 6 inches, a height of 6 inches, and a length of 10 feet. The first step 409 can have a width of 6 inches, a height of 6 inches, and a length of 6 feet. Disposed on the first step 409, the second step 412 can have a width of 6 inches, a height of 6 inches, and a length of 5 feet. When the first step 409 and the second step 412 are coupled at an interior distal end to the horizontal support 415, two two-foot steps are formed, with a third step being the balance beam 403. The tie post 424 can include a width of 2 inches, a height of 18 inches (or other height substantially similar to the overall height of the freestanding portable pet apparatus 400), and a length of 12 inches. The horizontal supports can include a width of 2 inches, a height of 12 inches, and a length of 36 inches. A top of the horizontal supports 415 can be substantially similar to a width of the balance beam 403. It should be noted that the dimensions described in FIG. 9 are merely for example purposes, and that the freestanding portable pet apparatus 400 can assume other dimensions, as suited.

In various embodiments, the components of the freestanding portable pet apparatuses 100, 200, 300, and 400 described herein can be constructed of recycled plastic, such as high-density polyethylene. In other embodiments, the components can be constructed of natural weather-resistant cedar or pressure-treated lumber. To this end, in various embodiments, the freestanding portable pet apparatuses 100, 200, 300, and 400 can be positioned on a terrain without the use of concrete footers or any other permanent affixing mechanism, while remaining stable enough to withstand a load and movement of a pet without the apparatus moving or toppling over.

Recycled plastic can include, for example, high-density polyethylene or another suitable material capable of bearing loads of one or more animals (plus a safety factor). The recycled plastic may also include fiberglass elements to reinforce the high density polyethylene. The recycled plastic can be treated by an extrusion process, which causes the recycled plastic to become textured and more-easily gripped. Therefore, pets can be able to move easier on the textured recycled plastic of the freestanding portable pet apparatus 200.

According to various embodiments, the recycled plastic can include ultraviolet additives to prevent deterioration when the recycled plastic is exposed to ultraviolet light. The recycled plastic can include a rot-resistant material and a splinter-free material. The recycled plastic can be resistant to marine borers, termites, fungus, salt and oils. The recycled plastic can also absorb up to approximately 6% moisture by weight. The recycled plastic can include a static dry coefficient of friction in the range of 0.3-0.6, a static wet coefficient of friction in the range of 0.3-0.6, a sliding dry coefficient of friction in the range of 0.2-0.3, and/or a sliding wet coefficient of friction in the range of 0.4-0.6.

As previously discussed, the various components described herein can include for example, boards or blocks made of cedar wood or another type of pressure-treated lumber. Cedar wood can be employed and particularly effective because of dogs' preference of its natural smell. A stain can be employed on the natural wood as cedar wood contains UV inhibitors, which can help preserve the wood and stain colorant. For example, the stain can include a 100% acrylic formula.

The components described herein can be coupled using glue, nails, screws, bolts, nuts, washers, and/or other suitable coupling mechanisms. To increase portability of the various apparatuses described herein, in some embodiments, screws are used to facilitate coupling and decoupling various components.

Figure 10:
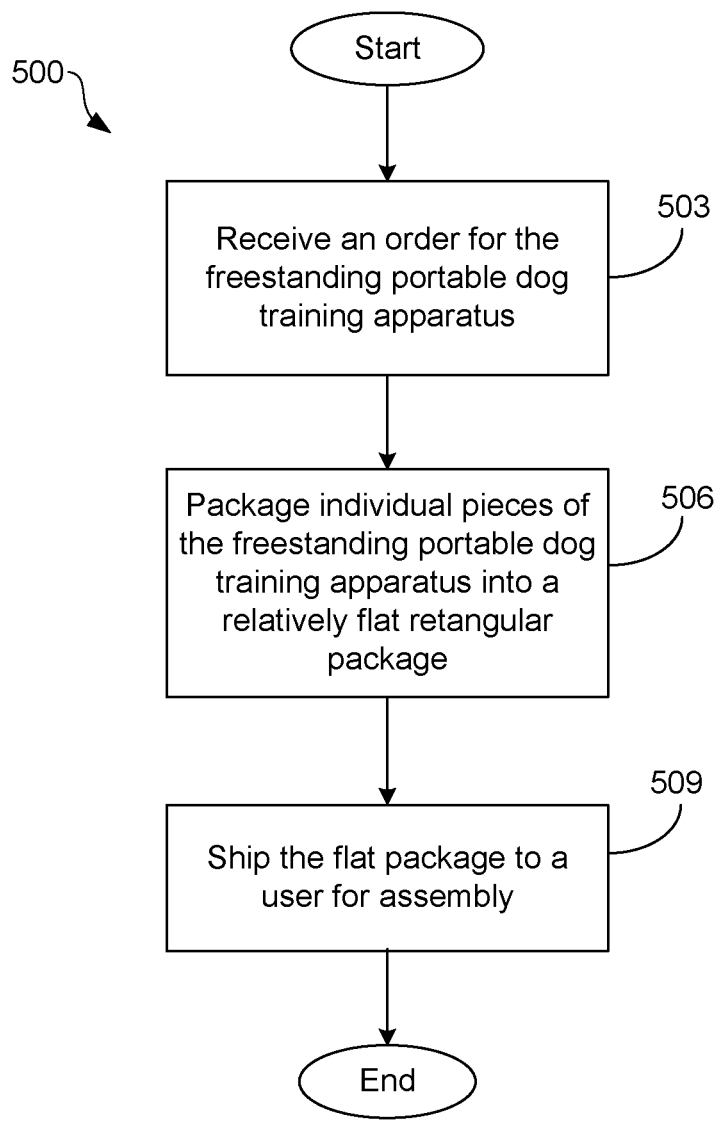
FIG. 10 is a flowchart illustrating an example of a method of providing the freestanding portable pet apparatus to an end user according to various embodiments of the present disclosure.

With reference to FIG. 10, shown is a flowchart 500 illustrating one example of a method of providing the freestanding portable pet apparatuses 100, 200, 300, and 400 to an end user according to various embodiments of the present disclosure. Beginning with box 503, an order is received for at least one of the freestanding portable pet apparatuses 100, 200, 300, and 400. The order can include a customized selection of the freestanding portable pet apparatuses 100, 200, 300, and 400. For example, the order may specify certain colors, designs, or examples. The order can be received for example, through an electronic commerce website, over the phone, or through any other suitable means. Next, in box 506, the individual pieces and components of the freestanding portable pet apparatuses 100, 200, 300, and 400 that were ordered are packaged into a relatively flat rectangular package to be sent to a user. The individual pieces can be assembled by a user without damaging a terrain that in which any piece of the freestanding portable pet apparatuses 100, 200, 300, and 400 comes into contact. For example, the user may use bolts to affix individual pieces together. Finally, at box 509, the package is sent to the user for assembly. The user can be for example, a retail consumer, a distributor, or a commercial end-user.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, the following is claimed:

1. A climbing apparatus for exercising or training pets, comprising:
   a first ramp directly coupled to a second ramp at a coupling point located at a peak of the climbing apparatus to form a triangular-shaped hill that is substantially symmetrical, the first ramp and the second ramp having approximately a same angle of incline the first ramp and the second ramp having solid surfaces with no apertures therein;
   a first plurality of ramp sides, wherein the first ramp is positioned between the first plurality of ramp sides such that the first plurality of ramp sides protrude above a surface of the first ramp to form a first plurality of ramp safety rails;
   a second plurality of ramp sides, wherein the second ramp is positioned between the second plurality of ramp sides such that the second plurality of ramp sides protrude above a surface of the second ramp to form a second plurality of ramp safety rails, wherein a top end of each of the first plurality of ramp sides is coupled to a top end of the second plurality of ramp sides at the coupling point;
   a first ramp foot, wherein a bottom end of each of the first plurality of ramp sides and a bottom end of the first ramp are coupled to the first ramp foot; and
   a second ramp foot, wherein a bottom end of each of the second plurality of ramp sides and a bottom end of the second ramp are coupled to the second ramp foot;
   wherein the climbing apparatus is freestanding and portable.

2. The climbing apparatus of claim 1, wherein a connection of the top end of the first plurality of ramp sides to the top end of the second plurality of ramp sides form approximately a 45 degree angle with respect to one another.

3. The climbing apparatus of claim 1, further comprising:
   a first plurality of supports projecting from a surface of the first ramp and spanning a width of the surface of the first ramp such that the first plurality of supports are coupled to each of the first plurality of ramp sides; and
   a second plurality of supports projecting from a surface of the second ramp and spanning a width of the surface of the second ramp such that the second plurality of supports are coupled to each of the second plurality of ramp sides.

4. The climbing apparatus of claim 1, wherein the first ramp, the second ramp, the first plurality of ramp sides, and the second plurality of ramp sides are formed of at least one of: recycled plastic, high-density polyethylene, natural wood, and cedar.

5. The climbing apparatus of claim 1, wherein the same angle of incline is approximately 20 to 35 degrees with respect to a line perpendicular to a resting surface on which the climbing apparatus is positioned.

6. The climbing apparatus of claim 1, wherein a height-to-width ratio of the climbing apparatus is approximately 0.43.

7. The climbing apparatus of claim 1, further comprising:
   a first post for supporting the climbing apparatus at a first side; and
   a second post for supporting the climbing apparatus at a second side.

8. The climbing apparatus of claim 7, further comprising a platform foot, wherein the first post and the second post are coupled to the platform foot.

9. The climbing apparatus of claim 8, wherein the platform foot has a width substantially similar to a width of the first ramp foot and the second ramp foot.

10. The climbing apparatus of claim 8, wherein the platform foot has a width at least as wide as the first ramp foot and the second ramp foot.

11. A method for exercising or training pets, comprising:
    providing a climbing apparatus that is freestanding and portable, the climbing apparatus comprising:
        a first ramp directly coupled to a second ramp at a coupling point located at a peak of the climbing apparatus to form a triangular-shaped hill that is substantially symmetrical, the first ramp and the second ramp having approximately a same angle of incline, the first ramp and the second ramp having solid surfaces with no apertures therein;
        a first plurality of ramp sides, wherein the first ramp is positioned between the first plurality of ramp sides such that the first plurality of ramp sides protrude above a surface of the first ramp to form a first plurality of ramp safety rails;
        a second plurality of ramp sides, wherein the second ramp is positioned between the second plurality of ramp sides such that the second plurality of ramp sides protrude above a surface of the second ramp to form a second plurality of ramp safety rails, wherein a top end of each of the first plurality of ramp sides is coupled to a top end of the second plurality of ramp sides at the coupling point;
        a first ramp foot, wherein a bottom end of each of the first plurality of ramp sides and a bottom end of the first ramp are coupled to the first ramp foot; and
        a second ramp foot, wherein a bottom end of each of the second plurality of ramp sides and a bottom end of the second ramp are coupled to the second ramp foot.

12. The method of claim 11, wherein a connection of the top end of the first plurality of ramp sides to the top end of the second plurality of ramp sides form approximately a 45 degree angle with respect to one another.

13. The method of claim 11, further comprising:
    providing a first plurality of supports projecting from a surface of the first ramp and spanning a width of the surface of the first ramp such that the first plurality of supports are coupled to each of the first plurality of ramp sides; and
    providing a second plurality of supports projecting from a surface of the second ramp and spanning a width of the surface of the second ramp such that the second plurality of supports are coupled to each of the second plurality of ramp sides.

14. The method of claim 11, further comprising forming the first ramp, the second ramp, the first plurality of ramp sides, and the second plurality of ramp sides using at least one of: recycled plastic, high-density polyethylene, natural wood, and cedar.

15. The method of claim 11, wherein the same angle of incline is approximately 20 to 35 degrees with respect to a line perpendicular to a resting surface on which the climbing apparatus is positioned.

16. The method of claim 11, wherein a height-to-width ratio of the climbing apparatus is approximately 0.43.

17. The method of claim 11, further comprising:
providing a first post for supporting the climbing apparatus at a first side; and
providing a second post for supporting the climbing apparatus at a second side.

18. The method of claim 17, further comprising providing a platform foot, wherein the first post and the second post are coupled to the platform foot.

19. The method of claim 18, wherein:
the platform foot has a width substantially similar to a width of the first ramp foot and the second ramp foot; or
the platform foot has a width at least as wide as the first ramp foot and the second ramp foot.

20. A climbing apparatus for exercising or training pets, comprising:
a first ramp directly coupled to a second ramp at a coupling point located at a peak of the climbing apparatus to form a triangular-shaped hill that is symmetrical, the first ramp and the second ramp having a same or similar angle of incline, the first ramp and the second ramp having solid surfaces with no apertures therein;
a first plurality of ramp sides, wherein the first ramp is positioned between the first plurality of ramp sides;
a second plurality of ramp sides, wherein the second ramp is positioned between the second plurality of ramp sides;
a first ramp foot, wherein a bottom end of each of the first plurality of ramp sides and a bottom end of the first ramp are coupled to the first ramp foot;
a second ramp foot, wherein a bottom end of each of the second plurality of ramp sides and a bottom end of the second ramp are coupled to the second ramp foot;
a first post for supporting the climbing apparatus at a first side;
a second post for supporting the climbing apparatus at a second side; and
a platform foot, wherein the first post and the second post are coupled to the platform foot, wherein the climbing apparatus is freestanding and portable.

* * * * *